(12) United States Patent
Lee et al.

(10) Patent No.: US 7,418,991 B2
(45) Date of Patent: Sep. 2, 2008

(54) SUBSTRATE BONDING APPARATUS FOR MANUFACTURING LIQUID CRYSTAL DISPLAY DEVICE

(75) Inventors: Sang Seok Lee, Taegu-kwangyokshi (KR); Young Kug Lim, Kyongsangbuk-do (KR); Jong Han Kim, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 245 days.

(21) Appl. No.: 10/625,525

(22) Filed: Jul. 24, 2003

(65) Prior Publication Data
US 2004/0149228 A1    Aug. 5, 2004

(30) Foreign Application Priority Data
Nov. 18, 2002    (KR) .................. 10-2002-0071710

(51) Int. Cl.
*B29C 65/00*    (2006.01)
(52) U.S. Cl. .................. 156/381; 156/583.3
(58) Field of Classification Search .......... 156/381, 156/583.3, 583.91; 349/187, 60, 19
See application file for complete search history.

(56) References Cited

U.S. PATENT DOCUMENTS

| | | | |
|---|---|---|---|
| 2,874,751 A * | 2/1959 | Norton ............... | 100/319 |
| 3,769,132 A * | 10/1973 | Cram ................ | 156/286 |
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,324,053 A * | 6/1994 | Kubota et al. ........ | 279/128 |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,731,860 A | 3/1998 | Harada et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato | |

(Continued)

FOREIGN PATENT DOCUMENTS

CN    1447166 A    10/2003

(Continued)

*Primary Examiner*—Jeff H Aftergut
*Assistant Examiner*—Daniel McNally
(74) *Attorney, Agent, or Firm*—McKenna, Long & Aldridge LLP

(57) ABSTRACT

A substrate bonding apparatus for manufacturing a liquid crystal display (LCD) device includes stages, wherein the degree to which the stages are bent is minimized by the presence of elastic members.

1 Claim, 11 Drawing Sheets

U.S. PATENT DOCUMENTS

| | | |
|---|---|---|
| 5,952,678 A | 9/1999 | Ashida |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,092,578 A * | 7/2000 | Machida et al. ............ 156/358 |
| 6,163,357 A | 12/2000 | Nakamura |
| 6,219,126 B1 | 4/2001 | Von Gutfeld |
| 6,226,067 B1 | 5/2001 | Nishiguchi et al. |
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 2001/0021000 A1 | 9/2001 | Egami |
| 2002/0062787 A1 | 5/2002 | Hashizume et al. |
| 2003/0205333 A1* | 11/2003 | Hayafuji et al. ............ 156/580 |

FOREIGN PATENT DOCUMENTS

| | | |
|---|---|---|
| DE | 103 52 413 A1 | 6/2004 |
| EP | 1 003 066 A1 | 5/2000 |
| JP | 51-065656 | 6/1976 |
| JP | 57-038414 A1 | 3/1982 |
| JP | 57-088428 A1 | 6/1982 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 A1 | 8/1985 |
| JP | 60-217343 A1 | 10/1985 |
| JP | 61-007822 A1 | 1/1986 |
| JP | 61-055625 A1 | 3/1986 |
| JP | S62-054225 | 3/1987 |
| JP | S62-054228 | 3/1987 |
| JP | S62-054229 | 3/1987 |
| JP | 62-089025 A1 | 4/1987 |
| JP | 62-090622 A1 | 4/1987 |
| JP | 62-205319 A1 | 9/1987 |
| JP | 63-109413 A1 | 5/1988 |
| JP | 63-110425 A1 | 5/1988 |
| JP | 63-128315 A1 | 5/1988 |
| JP | 63-311233 A1 | 12/1988 |
| JP | H03-009549 | 1/1991 |
| JP | 04-015558 | 1/1992 |
| JP | H05-036425 | 2/1993 |
| JP | H05-036426 | 2/1993 |
| JP | H05-107533 | 4/1993 |
| JP | 05-127179 A1 | 5/1993 |
| JP | 05-154923 | 6/1993 |
| JP | 05-265011 A1 | 10/1993 |
| JP | 05-281557 A1 | 10/1993 |
| JP | 05-281562 A1 | 10/1993 |
| JP | H06-018829 | 1/1994 |
| JP | 06-051256 A1 | 2/1994 |
| JP | H06-064229 | 3/1994 |
| JP | 06-148657 A1 | 5/1994 |
| JP | 06-160871 | 6/1994 |
| JP | H06-194637 | 7/1994 |
| JP | 06-235925 | 8/1994 |
| JP | 06-265915 A1 | 9/1994 |
| JP | 6-073728 | 10/1994 |
| JP | 06-313870 | 11/1994 |
| JP | 07-084268 | 3/1995 |
| JP | 07-128674 A1 | 5/1995 |
| JP | 07-181507 A1 | 7/1995 |
| JP | H07-275770 | 10/1995 |
| JP | H07-275771 | 10/1995 |
| JP | H08-076133 | 3/1996 |
| JP | 08-095066 A1 | 4/1996 |
| JP | 08-101395 | 4/1996 |
| JP | 08-106101 A1 | 4/1996 |
| JP | H08-110504 | 4/1996 |
| JP | H08-136937 | 5/1996 |
| JP | 08-171094 A1 | 7/1996 |
| JP | 08-190099 A1 | 7/1996 |
| JP | H08-173874 | 7/1996 |
| JP | 08-240807 A1 | 9/1996 |
| JP | 09-005762 A1 | 1/1997 |
| JP | 09-026578 A1 | 1/1997 |
| JP | H09-001026 | 1/1997 |
| JP | 09-061829 | 3/1997 |
| JP | 09-073075 A1 | 3/1997 |
| JP | 09-073096 A1 | 3/1997 |
| JP | H09-094500 | 4/1997 |
| JP | 09-127528 A1 | 5/1997 |
| JP | 09-230357 A1 | 9/1997 |
| JP | 09-281511 A1 | 10/1997 |
| JP | 09-311340 A1 | 12/1997 |
| JP | 10-123537 A1 | 5/1998 |
| JP | 10-123538 A1 | 5/1998 |
| JP | 10-142616 A1 | 5/1998 |
| JP | 10-177178 | 6/1998 |
| JP | H10-174924 | 6/1998 |
| JP | 10-221700 A1 | 8/1998 |
| JP | 10-282512 A1 | 10/1998 |
| JP | 10-333157 | 12/1998 |
| JP | 10-333159 | 12/1998 |
| JP | 11-014953 | 1/1999 |
| JP | 11-038424 A1 | 2/1999 |
| JP | 11-064811 A1 | 3/1999 |
| JP | 11-109388 A1 | 4/1999 |
| JP | 11-133438 | 5/1999 |
| JP | 11-142864 | 5/1999 |
| JP | 11-174477 A1 | 7/1999 |
| JP | 11-212045 A1 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 A1 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000284295 A * | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |

| | | | | | | |
|---|---|---|---|---|---|---|
| JP | 2001-154211 | 6/2001 | | JP | 2002-139734 | 5/2002 |
| JP | 2001-166272 | 6/2001 | | JP | 2002-156518 | 5/2002 |
| JP | 2001-166310 | 6/2001 | | JP | 2002-169166 | 6/2002 |
| JP | 2001-183683 | 7/2001 | | JP | 2002-169167 | 6/2002 |
| JP | 2001-209052 | 8/2001 | | JP | 2002-182222 | 6/2002 |
| JP | 2001-209056 | 8/2001 | | JP | 2002-202512 A1 | 7/2002 |
| JP | 2001-209057 | 8/2001 | | JP | 2002-202514 A1 | 7/2002 |
| JP | 2001-209058 | 8/2001 | | JP | 2002-214626 A1 | 7/2002 |
| JP | 2001-209060 | 8/2001 | | JP | 2002-228999 | 8/2002 |
| JP | 2001-222017 | 8/2001 | | JP | 2002-229042 | 8/2002 |
| JP | 2001-235758 | 8/2001 | | JP | 2002-236276 | 8/2002 |
| JP | 2001-215459 | 9/2001 | | JP | 2002-258299 | 8/2002 |
| JP | 2001-255542 | 9/2001 | | JP | 2002-236292 | 9/2002 |
| JP | 2001-264782 | 9/2001 | | JP | 2002-277865 | 9/2002 |
| JP | 2001-201750 | 10/2001 | | JP | 2002-277866 | 9/2002 |
| JP | 2001-272640 | 10/2001 | | JP | 2002-277881 | 9/2002 |
| JP | 2001-281675 | 10/2001 | | JP | 2002-287156 | 10/2002 |
| JP | 2001-281678 | 10/2001 | | JP | 2002-296605 | 10/2002 |
| JP | 2001-282126 | 10/2001 | | JP | 2002-311438 | 10/2002 |
| JP | 2001-305563 | 10/2001 | | JP | 2002-311440 | 10/2002 |
| JP | 2001-330837 | 11/2001 | | JP | 2002-311442 | 10/2002 |
| JP | 2001-330840 A1 | 11/2001 | | JP | 2002296605 A | 10/2002 |
| JP | 2001-356353 | 12/2001 | | JP | 2002-323687 | 11/2002 |
| JP | 2001-356354 A1 | 12/2001 | | JP | 2002-323694 | 11/2002 |
| JP | 2002-014360 A1 | 1/2002 | | JP | 2002-333628 | 11/2002 |
| JP | 2002-023176 A1 | 1/2002 | | JP | 2002-333635 | 11/2002 |
| JP | 2002-049045 A1 | 2/2002 | | JP | 2002-333843 | 11/2002 |
| JP | 2002-079160 | 3/2002 | | JP | 2002-341329 | 11/2002 |
| JP | 2002-080321 | 3/2002 | | JP | 2002-341355 | 11/2002 |
| JP | 2002-082340 A1 | 3/2002 | | JP | 2002-341356 | 11/2002 |
| JP | 2002-090759 A1 | 3/2002 | | JP | 2002-341357 | 11/2002 |
| JP | 2002-090760 A1 | 3/2002 | | JP | 2002-341358 | 11/2002 |
| JP | 2002-107740 A1 | 4/2002 | | JP | 2002-341359 | 11/2002 |
| JP | 2002-122870 | 4/2002 | | JP | 2002-341362 | 11/2002 |
| JP | 2002-122872 A1 | 4/2002 | | KR | 2000-035302 A1 | 6/2000 |
| JP | 2002-122873 A1 | 4/2002 | | | | |
| JP | 2002-131762 | 5/2002 | | * cited by examiner | | |

SUBSTRATE BONDING APPARATUS FOR MANUFACTURING LIQUID CRYSTAL DISPLAY DEVICE

This application claims the benefit of the Korean Application No. P2002-71710 filed on Nov. 18, 2002, which is hereby incorporated by reference for all purposes as if fully set forth herein. This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to manufacturing apparatuses, and more particularly, to a substrate bonding apparatus for manufacturing liquid crystal display (LCD) devices formed via liquid crystal dispensing methods.

2. Discussion of the Related Art

With the expansion of the information society, a need has arisen for displays capable of producing high quality images in thin, lightweight packages and that consume little power. To meet such needs, research has produced a variety of flat panel display devices, including liquid crystal displays (LCD), plasma displays (PDP), electro luminescent displays (ELD), and vacuum fluorescent displays (VFD). Some of these display technologies have already been applied in information displays.

Of the various types of flat panel display devices, LCD devices, having excellent display quality, light weight, thin dimensions, and consuming low amounts of power, have been very widely used. In fact, in portable devices, such as notebook PC computers, LCD technology has already replaced cathode ray tubes (CRT) as the display of choice. Moreover, even in desktop PCs and in TV monitors, LCDs devices are becoming more common.

Despite various technical developments in LCD technology, however, research in enhancing the picture quality of LCD devices has been lacking compared to research in other features and advantages of LCD devices (e.g., light weight, thin profile, low power consumption, etc.). Therefore, to increase the use of LCD devices as displays in various fields of application, LCD devices capable of expressing high quality images (e.g., images having a high resolution and a high luminance) with large-sized screens, while still maintaining a light weight, minimal dimensions, and low power consumption must be developed.

Related art LCD devices can generally be fabricated according to either a liquid crystal injection method or a liquid crystal dispensing method. In fabricating LCDs using the liquid crystal injection method, a sealant pattern is formed on one of two substrates, wherein the sealant pattern includes an injection inlet; the other of the two substrates is bonded to the one substrate in a first vacuum chamber; and liquid crystal material is injected through the injection inlet in a second vacuum chamber. Japanese Patent Application Nos. 2000-284295 and 2001-5405 can be understood to disclose a method of dispensing liquid crystal material wherein, after liquid crystal material is dispensed onto one of two substrates, the other of the two substrates is then arranged over, and bonded to the one substrate in a vacuum. Generally, liquid crystal material dispensing methods are advantageous over liquid crystal material injection methods because they reduce the number of fabrication steps required to fabricate LCD panels (e.g., formation of the liquid crystal injection hole, injection of the liquid crystal material, sealing of the liquid crystal injection hole, etc., are omitted), thereby simplifying fabrication of LCD panels. Accordingly, fabricating LCD panels by dispensing liquid crystal material have been the subject of recent research.

FIGS. 1 and 2 illustrate a related art substrate bonding device used in fabricating LCD panels formed with dispensed liquid crystal material.

Referring to FIGS. 1 and 2, a related art substrate bonding device is provided with a frame 10, an upper stage 21, a lower stage 22, a sealant dispensing part (not shown), a liquid crystal material dispensing part 30, an upper chamber unit 31, a lower chamber unit 32, chamber moving system, and stage moving system.

The sealant dispensing part (not shown) and liquid crystal dispensing part 30 are typically provided at a side portion of the frame 10. Moreover, the upper and lower chamber units 31 and 32, respectively, can be joined to each other to bond substrates of an LCD panel.

The chamber moving system generally includes a driving motor 40 for moving the lower chamber unit 32 laterally to predetermined positions where the substrates are to be bonded (S2) and where the sealant material is to be coated and where the liquid crystal material is to be dispensed (SI). The stage moving system includes a driving motor 50 for raising and lowering the upper stage 21 to predetermined positions.

A method for fabricating an LCD panel using the related art substrate bonding apparatus will now be described in greater detail.

A first substrate 51 is positioned on the lower stage 22 of the lower chamber unit 32 and the chamber moving system 40 moves the lower chamber unit 32 under the upper chamber unit 31 such that the lower stage 22 is beneath the upper stage 21. Next, the driving motor 50 of the stage moving system lowers the upper stage 21 to a predetermined position such that the first substrate 51 is secured to the lowered upper stage 21. Subsequently, the upper stage 21, to which the first substrate 51 is secured, is raised to a predetermined position. The chamber moving system 40 then moves the lower chamber unit 32 to a position where a second substrate 52 is loaded on the lower stage 22. Subsequently, the chamber moving system 40 moves the lower chamber unit 32 to a first predetermined position S1 (as shown in FIG. 1). At the first predetermined position S1, sealant material coating and liquid crystal material dispensing processes are applied to the second substrate 52 using the sealant dispensing part (not shown) and the liquid crystal dispensing part 30, respectively. After the coating the sealant material and dispensing the liquid crystal material, the chamber moving system 40 moves the lower chamber unit 32 to a second predetermined position S2 (as shown in FIG. 2) where the first and second substrates 51 and 52, respectively, can be bonded together. Next, the upper and lower chamber units 31 and 32, respectively, are joined to each other such that the upper and lower stages 21 and 22, respectively, are arranged within an enclosed space. A vacuum is then created within the enclosed space using an evacuating means (not shown). After the vacuum is created, the stage moving system 50 lowers the upper stage 21 such that the first substrate 51, secured to the upper stage 21, contacts the second substrate 52 on the lower stage 22. The upper stage 21 is lowered until the two substrates become bonded, thereby completing the fabrication of the LCD panel.

Use of the aforementioned related art substrate LCD device substrate bonding device is disadvantageous, however, because the overall size of the aforementioned related art substrate bonding device is excessively large, especially when designed to fabricate large-sized LCD panels. The excessively large overall size of the related substrate bonding device creates problems when designing LCD device fabrication processes because an adequate amount of space must be provided to install the related art substrate bonding device while preserving the space in which other apparatuses of other processes are located.

Further, the space between the upper and lower chamber units 31 and 32 is excessively large and increases the amount of time required to create a vacuum during bonding of the substrates.

Finally, the related art substrate bonding apparatus cannot substantially prevent the stages from being bent. More specifically, the upper and lower stages may be bent due to the weight of the stages themselves and due to a difference in pressure between the interior and the exterior of the substrate bonding apparatus. When the stages become bent, the first and second substrates are bonded together poorly.

SUMMARY OF THE INVENTION

Accordingly, the present invention is directed to a substrate bonding apparatus for manufacturing an LCD device that substantially obviates one or more problems due to limitations and disadvantages of the related art.

An advantage of the present invention provides a substrate bonding apparatus for manufacturing an LCD device that decreases the degree to which the upper and lower stages are bent during a substrate bonding process.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a substrate bonding apparatus may, for example, include a base frame for providing an exterior appearance; a lower chamber unit mounted to the base frame; an upper chamber unit positioned over the lower chamber unit and joinable to the lower chamber unit; an upper stage and a lower stage provided within interior spaces of the upper and lower chamber units, respectively, for securing a first substrate and a second substrate, respectively; and a plurality of elastic members arranged between at least one of the upper and lower chamber units and a corresponding one of the upper and lower stages.

In one aspect of the present invention, the elastic members may be provided as at least one of a press spring, an initially-coned disk spring, and a plate spring for providing a restoring force to the at least one of the upper and lower chamber units and the corresponding one of the upper and lower stages, thereby preventing a surface of the corresponding one of the upper and lower stages from being convexly bent within the substrate bonding apparatus. Accordingly, deformation of the upper and lower stages may be substantially prevented when the stages are pressed and bonding of the substrates may be uniformly performed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
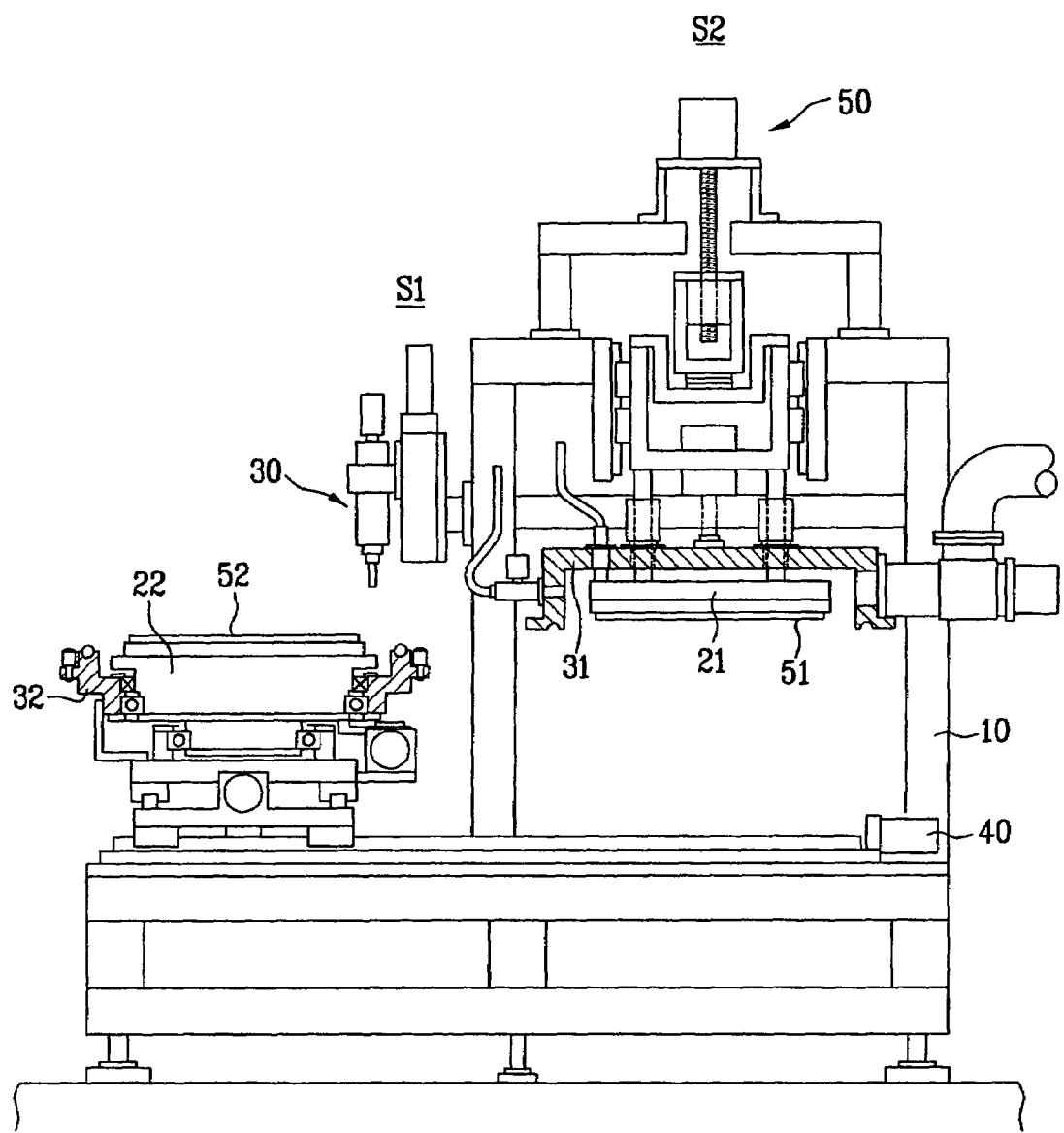
FIGS. 1 and 2 illustrate a related art substrate bonding apparatus for use in fabricating LCD panels formed via liquid crystal material dispensing methods.
Figure 2:
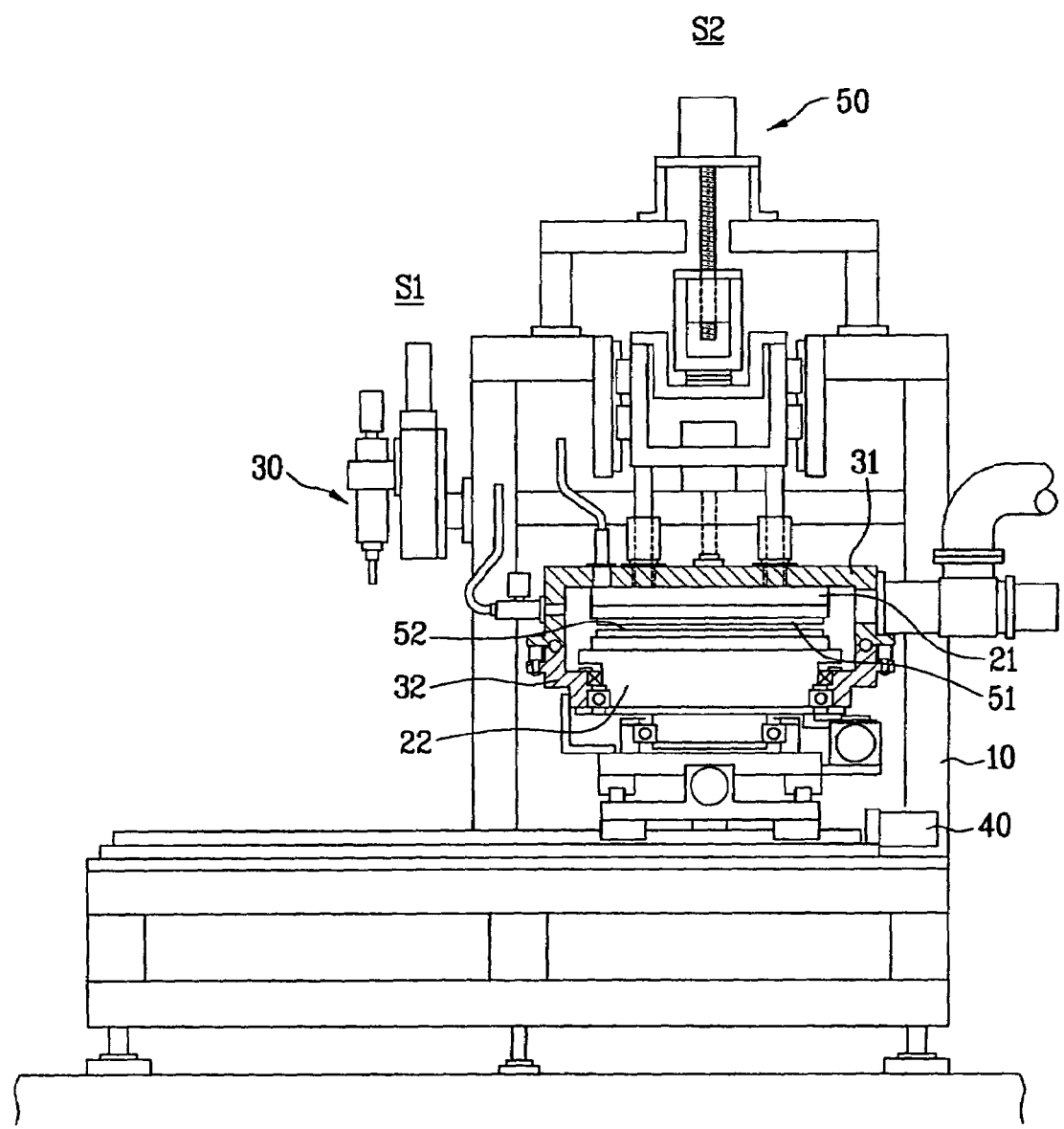

Reference will now be made in detail to embodiments of the present invention, examples of which are illustrated in the accompanying drawings. Wherever possible, the same reference numbers will be used throughout the drawings to refer to the same or like parts.

Referring to FIGS. 3A to 8, the substrate bonding apparatus for manufacturing LCD devices according to the principles of the present invention may, for example, include a base frame 100, an upper chamber unit 210, a lower chamber unit 220, an upper stage 230, a lower stage 240, a plurality of elastic members 300, and a sealing means (e.g., 250).

In one aspect of the present invention, the base frame 100 may be fixed to a supporting structure or surface (e.g., the ground), may form the exterior appearance of the substrate bonding apparatus, and may support different components discussed in greater detail below.

In another aspect of the present invention, upper and lower stages 230 and 240, respectively, may be fixed to the upper chamber unit 210 and the lower chamber unit 220, respectively. As will be described in greater detail below, the upper and lower chamber units 210 and 220 may be selectively joined to each other to define an interior space.

The upper chamber unit 210 may, for example, include an upper base 211 that may be exposed to an external environment and an upper chamber plate 212 immovably attached to a bottom surface of the periphery of the upper base 211. In one aspect of the present invention, the upper chamber plate 212 may be provided as a rectangular rim and define an interior space within which the upper stage 230 is fixed. Since the upper stage 230 is fixed to the upper chamber unit 210, the upper stage may be raised and lowered with the upper chamber unit 210. In another aspect of the present invention, a first seal member 213 may be arranged between the upper base 211 and the upper chamber plate 212 of the upper chamber unit 210 to seal the interior space defined by the upper chamber plate 212 from the external environment. In one aspect of the present invention, the first seal member 213 may be provided as a gasket, an O-ring, or the like, suitable for sealing. In another aspect of the present invention, upper stage 230 may secure a subsequently loaded first substrate 110.

The lower chamber unit 220 may, for example, include a lower base 221 fixed to the base frame 100 and a lower chamber plate 222 arranged above a top surface of the periphery of the lower base 221. In one aspect of the present invention, the lower chamber plate 222 may be provided as a rectangular rim and define an interior space within the which the lower stage 240 is fixed. In another aspect of the present invention the lower chamber plate 222 may be movable in left, right, forward, and backward (i.e., lateral) directions with respect to the lower base 221. In another aspect of the present invention, the lower chamber unit 220 may include a support plate 223 for stably fixing the lower base 221 to the base frame 100. In yet another aspect of the present invention, a second seal member 224 may be arranged between the lower base 221 and the lower chamber plate 222 of the lower chamber unit 220 and may seal the interior space defined by the lower chamber plate 222 from a the external environment. In one aspect of the present invention, the second seal member 224 may be provided as a gasket, an O-ring, or the like, suitable for sealing. In another aspect of the present invention, lower stage 240 may secure a subsequently loaded second substrate 120.

According to the principles of the present invention, at least one support part 225 may be arranged between the lower base 221 and the lower chamber plate 222 for maintaining the lower chamber plate 222 a predetermined a distance from the upper surface of the lower base 221. The support part 225 may include a first end attached to a bottom portion of the lower chamber plate 222 and a second end that is movable in lateral directions with respect to the lower base 221 and is attached to a piece that is attached to a bottom portion of the lower base 221. Accordingly, the support part 225 enables the lower chamber plate 222 to move in left, right, forward, and backward directions relative to the lower base 221.

Figure 3A:
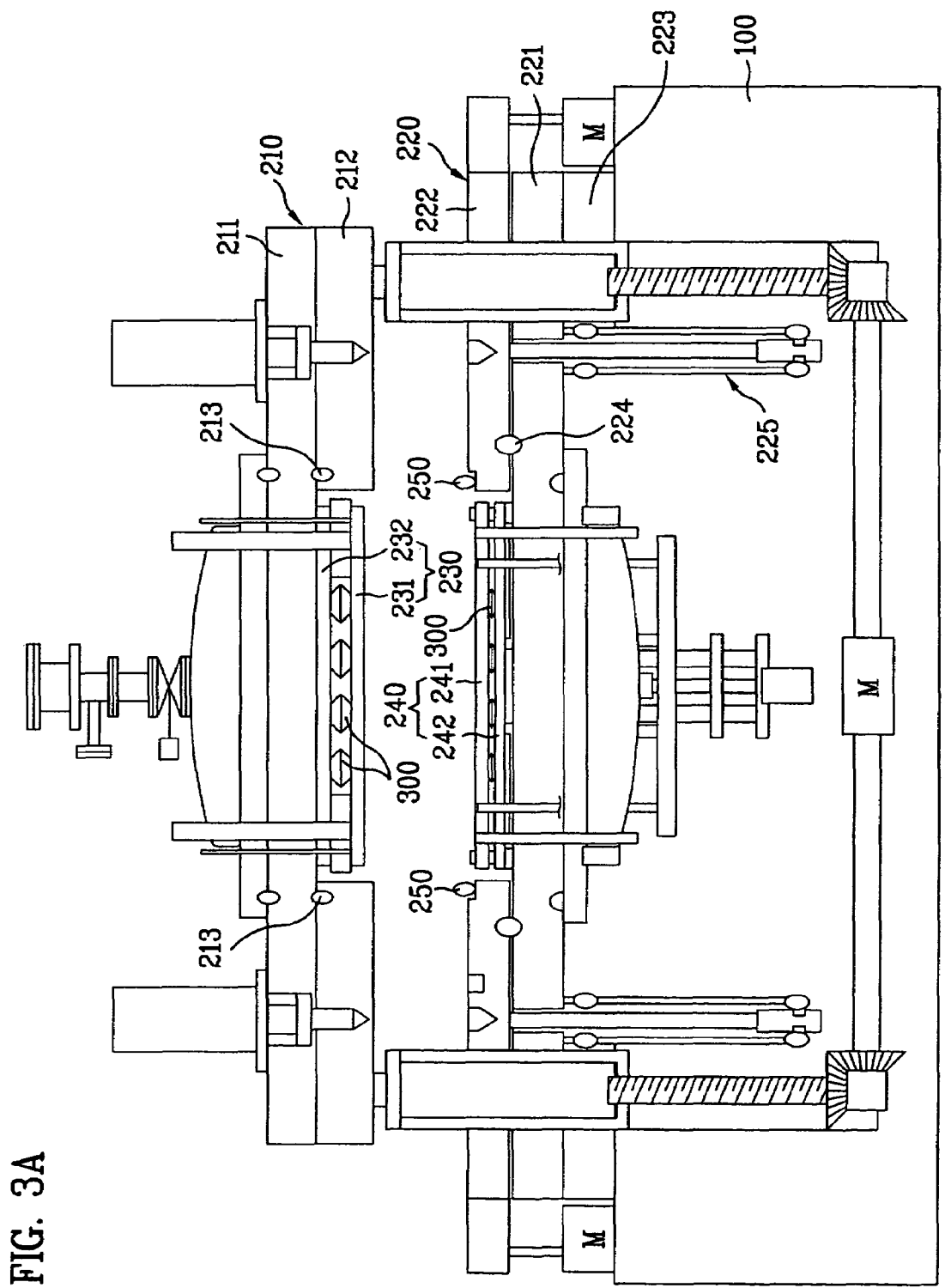
FIG. 3A illustrates an initial state of a substrate bonding apparatus for fabricating LCD panels in accordance with the principles of the present invention in an unloaded state.
Figure 3B:
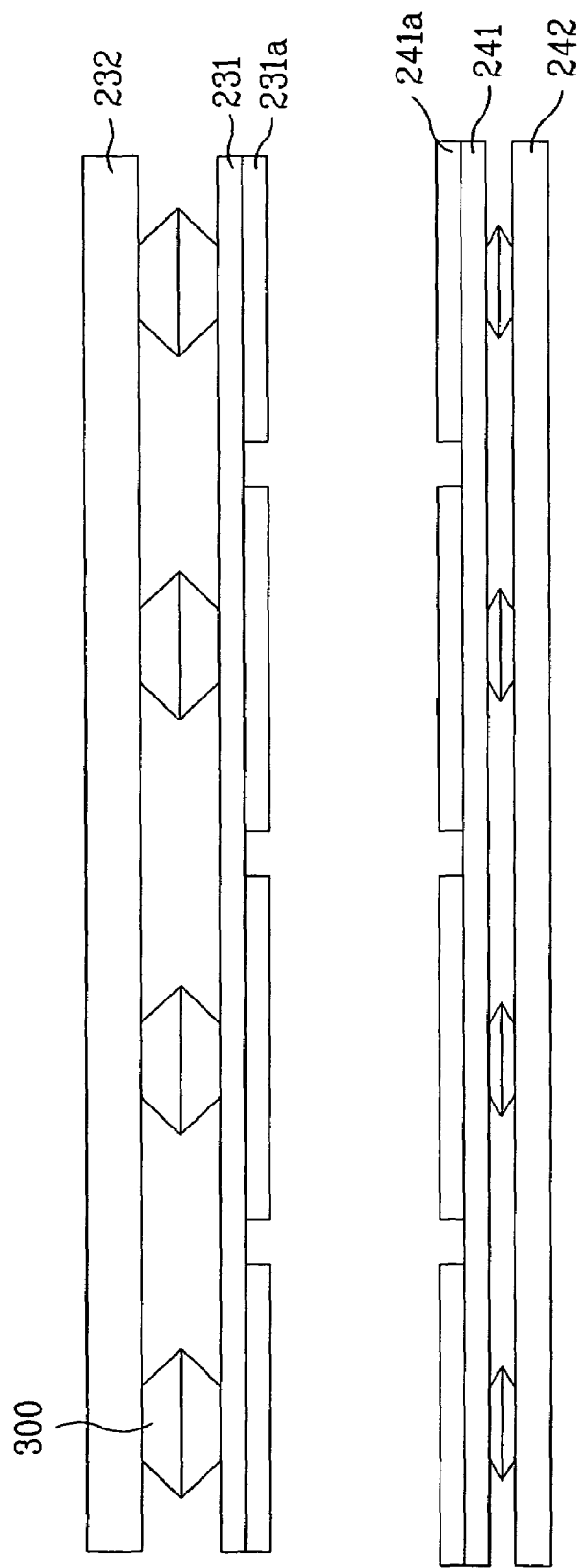
FIG. 3B illustrates upper and lower stages in the substrate bonding apparatus shown in FIG. 3A.

Referring to FIG. 3B, the upper and lower stages 230 and 240, respectively, may each include a fixing plate 232 and 242, respectively, fixed to a respective one of the upper chamber unit 210 and the lower chamber unit 220. Further, each of the upper and lower stages 230 and 240 may include a securing plate 231 and 241, respectively, for securing first and second substrates, respectively. In one aspect of the present invention, the securing plates 231 and 241 may each be provided as an electrostatic chuck (ESC) for securing a substrate to a respective one of the stages by applying an electrostatic charge. In another aspect of the present invention, each of the securing plates 231 and 241 may, for example, include four electrostatic chucks 231a and 241a, respectively. In still another aspect of the present invention, each of the securing plates 231 and 241 may, for example, additionally include a plurality of holes (not shown) for transmitting a suction force to secure respective ones of the substrates. Accordingly, each of the securing plates 231 and 241 may be formed out of a material such as stainless steel, an aluminum alloy, etc., having a thickness of at least about 40 mm and may be substantially prevented from being bent.

In one aspect of the present invention, the elastic members 300 may be provided between the upper chamber unit 210 and the upper stage 230 and between the lower chamber unit 220 and lower stage 240. Further, the elastic members 300 may be compressed in such a manner as to ensure that the respective stages 230 and 240 may be prevented from being bent even as other components within the upper and lower chamber units 210 and 220 are bent. Accordingly, even though the upper and lower chamber units 210 and 220 may be convexly bent within the substrate bonding apparatus of the present invention, the degree to which the securing plates 231 and 241 are bent may be minimized. In one aspect of the present invention, the elastic members 300 may be fixed between the securing plates 231 and 241 and corresponding ones of the fixing plates 232 and 242. Accordingly, the elastic members 300 may substantially prevent the securing plates 231 and 241, securing respective ones of the first and second substrates 110 and 120 from being bent, thereby maintaining a reliable and substantially uniform bond between the first and second substrates 110 and 120 during the substrate bonding process.

Figure 4A:
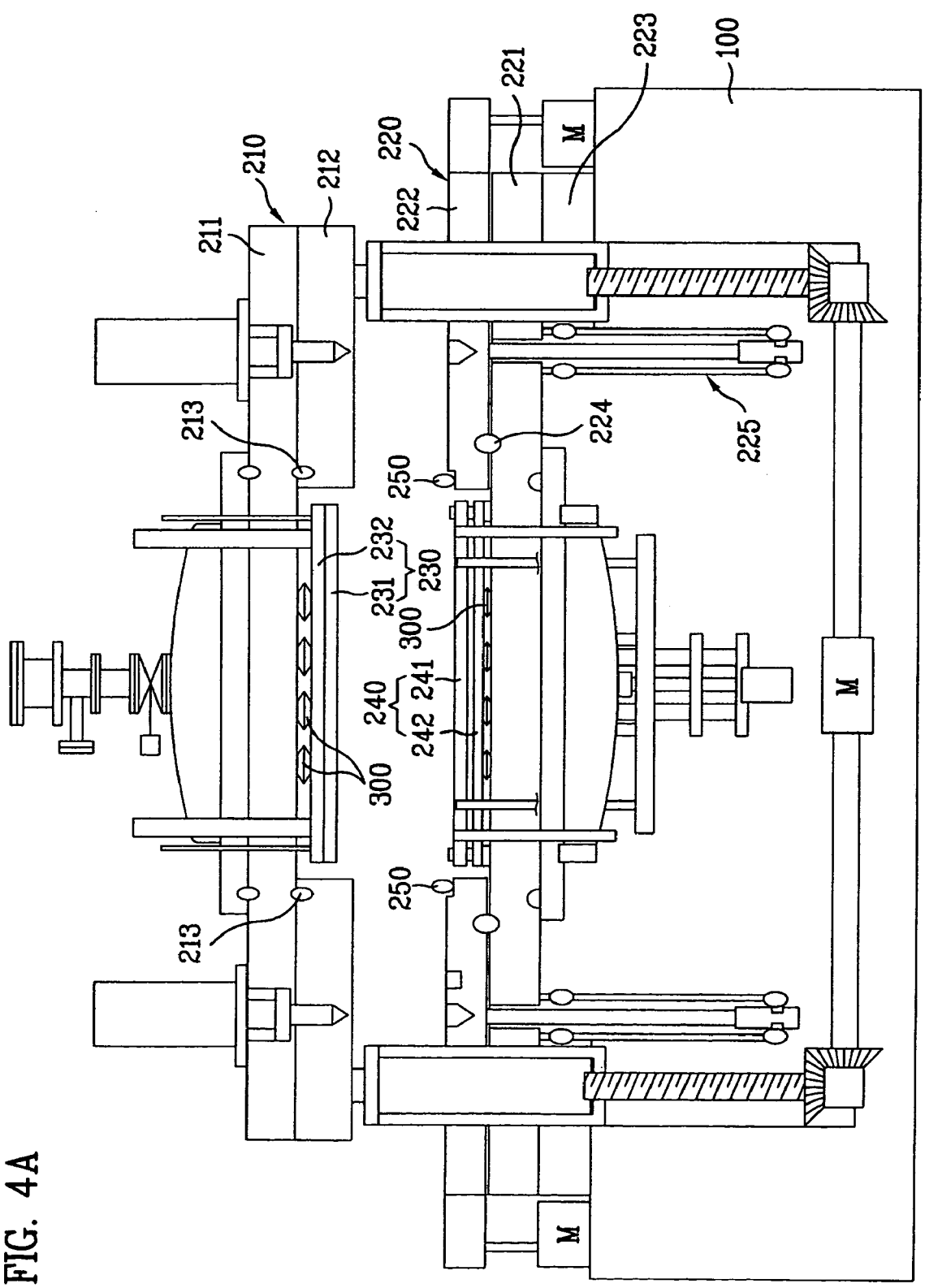
FIGS. 4A and 4B illustrate substrate bonding apparatuses for manufacturing LCD devices capable of preventing upper and lower stages from being bent according to the principles of the present invention.
Figure 4B:
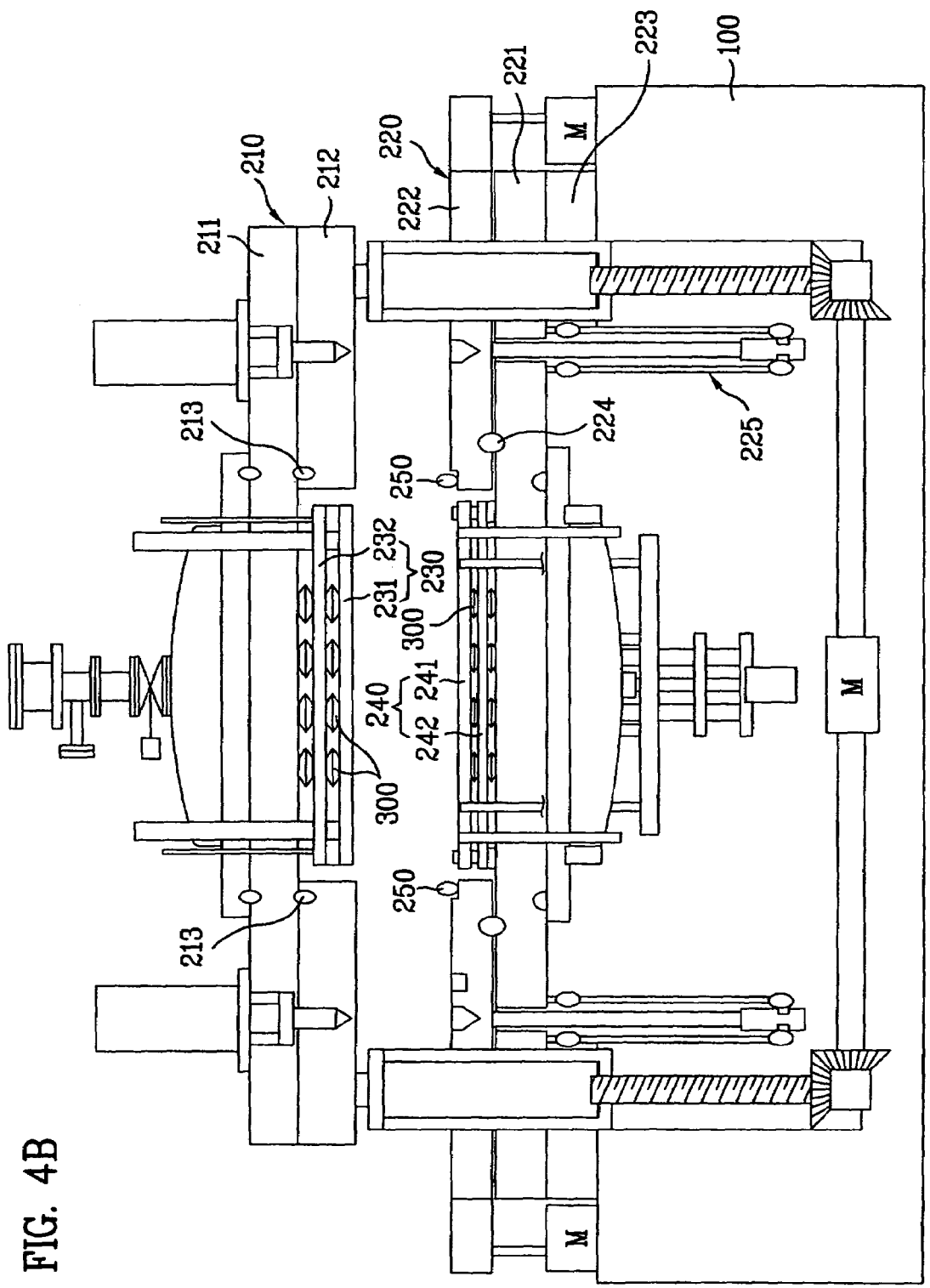
Figure 5:
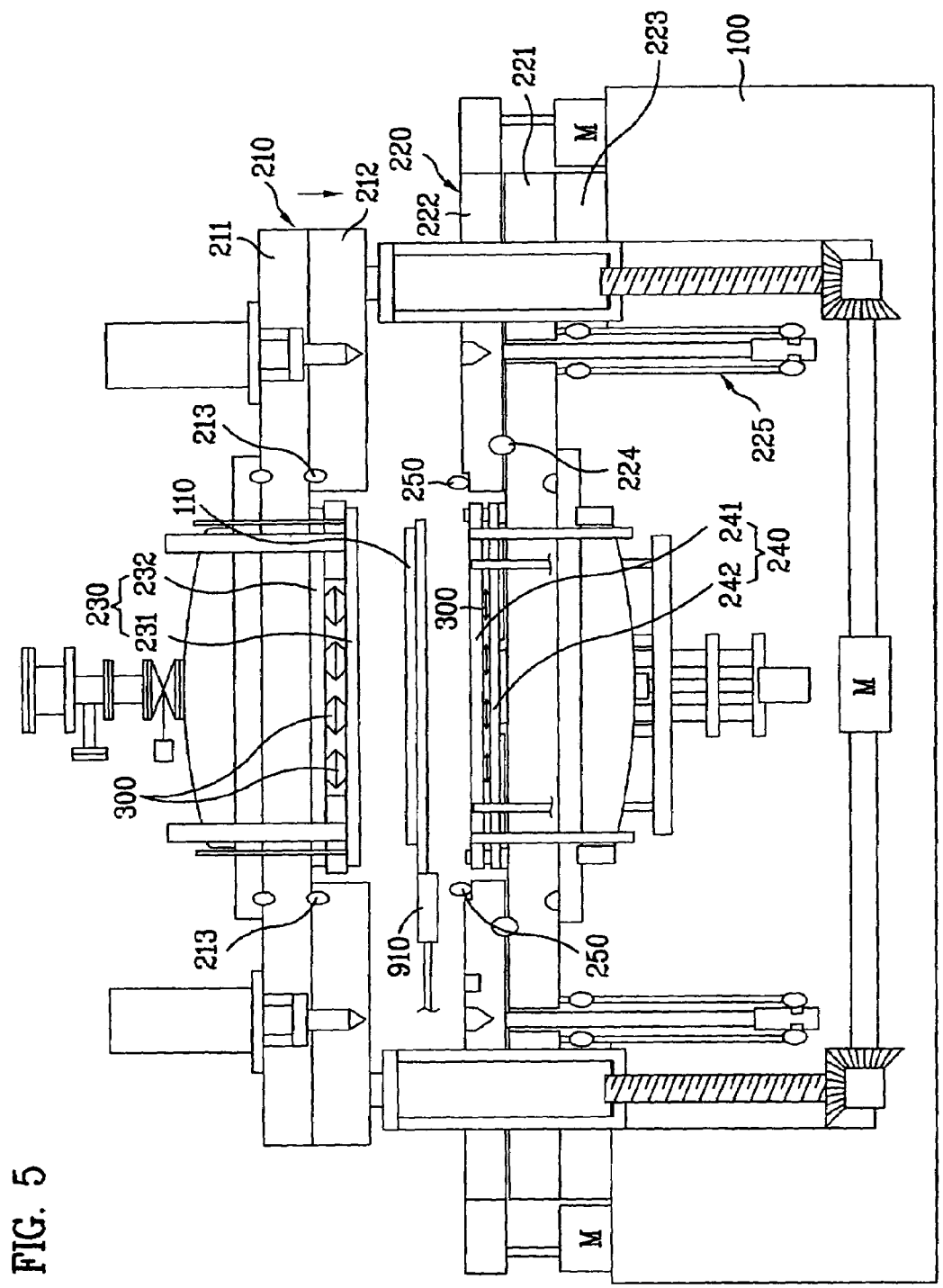
FIG. 5 illustrates the loading of a first substrate within the substrate bonding apparatus in accordance with the principles of the present invention.

In another aspect of the present invention, and while referring to FIG. 4A, the elastic members 300 may be provided between the fixing plates 232 and 242 and respective ones of the upper and lower chamber units 210 and 220, respectively. In yet another aspect of the present invention, and while referring to FIG. 4B, the elastic members 300 may be provided between the fixing plates 232 and 242 and respective ones of the securing plates 231 and 241, and between the fixing plates 232 and 242 and respective ones of the upper and lower chamber units 210 and 220, respectively.

According to the principles of the present invention, the elastic members 300 may be provided as press springs, initially-coned disk springs (i.e., springs that are substantially conically shaped when they support no external loads, as shown in the Figures), plate springs, and the like, to exert restoration forces to the respective chamber units 210 and 220 when the respective chamber units 210 and 220 are bent during, for example, a substrate bonding process. For example, elastic members 300 provided as initially-coned disk springs may provide restoration forces to wide areas.

According to the principles of the present invention, individual ones of the elastic members 300 may be provided with different restoration force constants in accordance with the arrangement of each individual elastic member 300 within the substrate bonding apparatus. Accordingly, elastic members 300 having different restoration force constants may substantially prevent the upper and lower stages 230 and 240 from being bent during substrate bonding processes. For example, center regions of stages in related art substrate bonding apparatuses are generally bent to a greater degree than peripheral regions of the related art stages. Therefore, and in one aspect of the present invention, elastic members 300 arranged proximate the center of each of the stages 230 and 240 may be provided with a restoration force constant that is greater than the restoration force constant of elastic members 300 arranged at peripheral regions of the stages 230 and 240. In another aspect of the present invention, elastic members 300 may be provided at the center regions of the stages 230 and 240 while substantially inelastic blocks may be provided in the peripheral regions of the stages 230 and 240. In yet another aspect of the present invention the positions of the elastic members 300 may substantially correspond with the positions of the electrostatic chucks 231a and 241a.

Referring back to FIG. 3A, the sealing means 250 may be provided as an O-ring, formed of a material such as rubber, and fitted along a top surface of the lower chamber plate 222 of the lower chamber unit 220. In one aspect of the present invention, the sealing means 250 may project from the top surface of the lower chamber plate 222 to a predetermined height such that the interior space defined by the joined upper and lower chamber units 210 and 220 is substantially sealed from the external environment. In another aspect of the present invention, the sealing means 250 may project from the top surface of the lower chamber plate 222 to a predetermined height and be formed to a predetermined thickness sufficient to prevent substrates, secured by respective ones of the upper and lower stages 230 and 240, from becoming proximately arranged next to each other upon initially joining the upper and lower chamber units 210 and 220, as will be discussed in greater detail below. In yet another aspect of the present invention, the thickness of the sealing means 250 may be sufficient to permit the substrates to contact each other when the sealing means 250 is compressed.

A method for fabricating an LCD device using the substrate bonding apparatus will now be described in greater detail.

Figure 6:
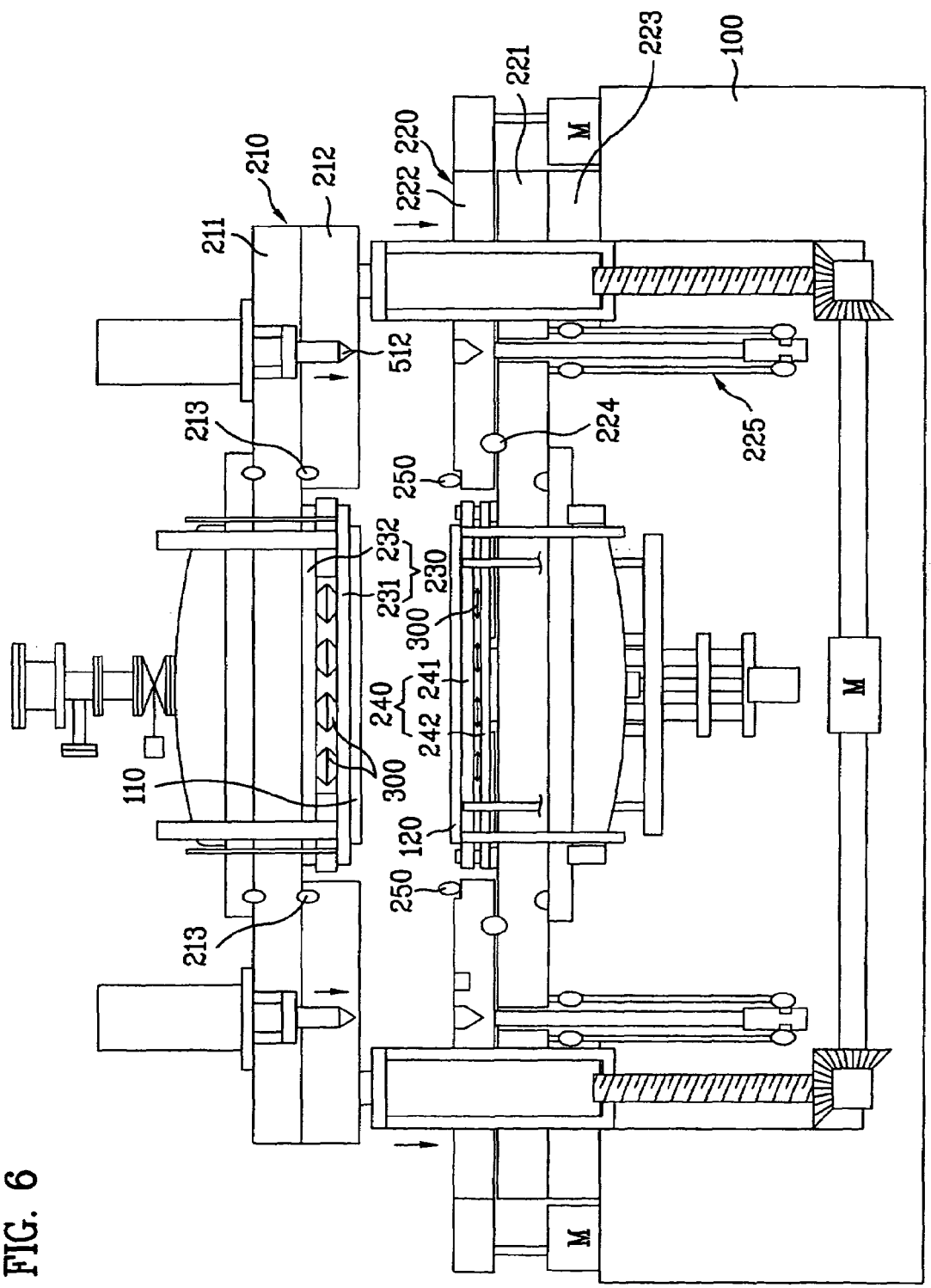
FIG. 6 illustrates the securing of loaded first and second substrates to their respective stages in the substrate bonding apparatus for manufacturing LCD devices according to the principles of the present invention.

The substrate bonding device may first be provided in the unloaded state as shown in FIG. 3A. Subsequently, and while referring to FIG. 5, a first substrate 110 may be brought into a space between the upper and lower chamber units 210 and 220, respectively, via a loader 910. Next, the first substrate 110 may be secured to the upper chamber unit 210 and the loader 910 may be removed from the substrate bonding apparatus. Subsequently, the second substrate 120, onto which liquid crystal material is dispensed, may be brought into the space between the upper and lower chamber units 210 and 220 via the loader 910 and secured to the lower stage 240, as shown in FIG. 6.

Figure 7A:
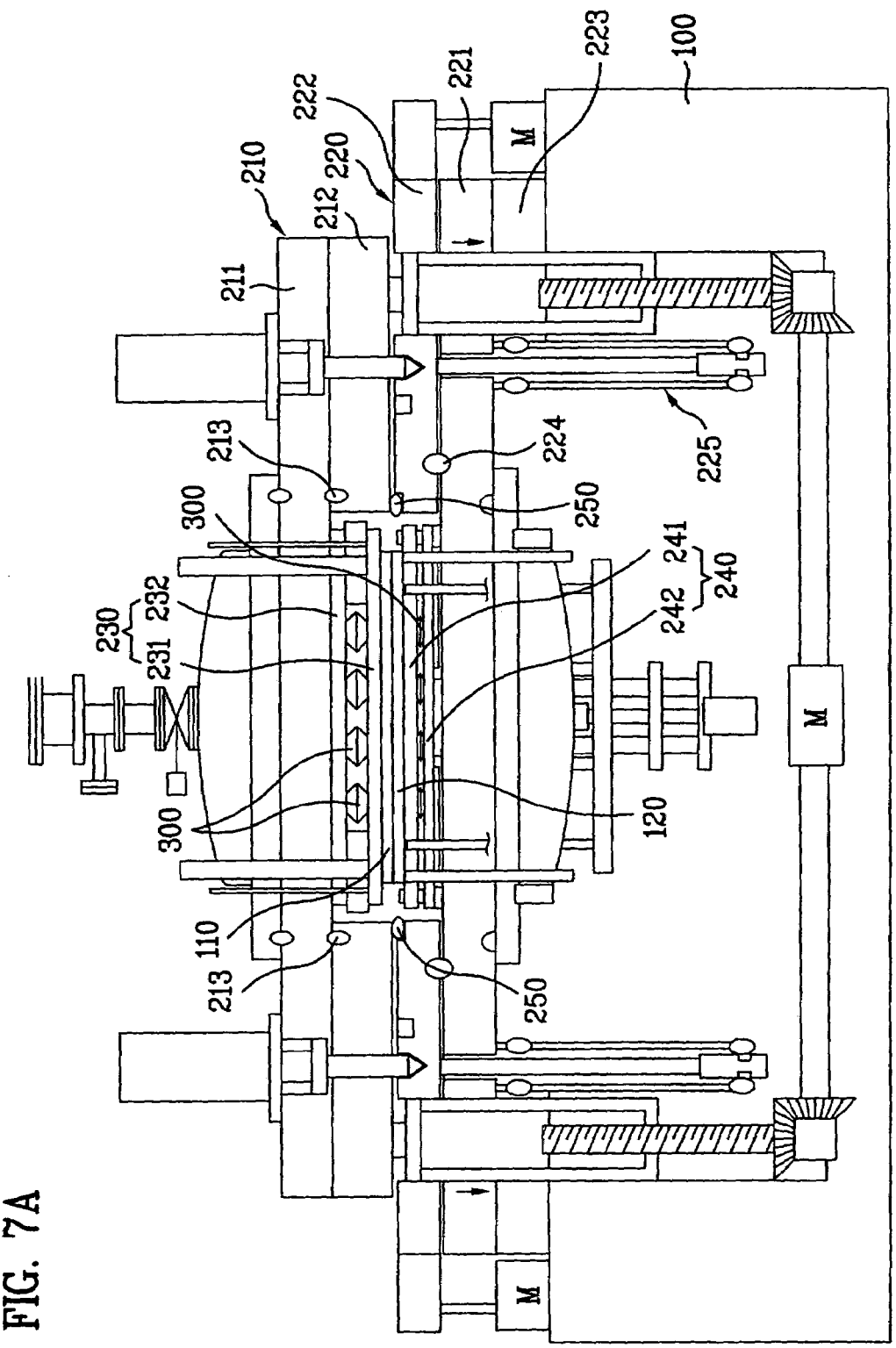
FIGS. 7A and 7B illustrate generating a vacuum in chamber units of the substrate bonding apparatus for manufacturing LCD devices according to the principles of the present invention.

Referring to FIG. 7A, the upper chamber unit 210 may be lowered by a chamber moving means after the first and second substrates have been secured to their respective stages. Accordingly, the chamber moving means may raise and lower the upper chamber unit 210 as required.

According to the principles of the present invention, the chamber moving means may be provided within an interior of the base frame 100, below the lower chamber unit 220, may be coupled to the upper chamber unit 210, and may raise/lower the upper chamber unit 210. In another aspect of the present invention, however, the chamber moving means may be provided within the upper chamber unit 210 to raise and lower the upper chamber unit 210. When lowering the upper chamber unit 210, the lower surface of the upper chamber unit 210 may initially contact the sealing means 250, arranged on the lower chamber unit 220. Accordingly, an interior space defined by the upper and lower chamber units 210 and 220, and within which the secured first and second substrates 110 and 120 are arranged, may be substantially sealed from an external environment while the first substrate 110 may remain spaced apart from the second substrate 120 by a predetermined distance.

After the interior space has been substantially sealed, the interior space, defined by the joined upper and lower chamber units 210 and 220, may be substantially evacuated to create a vacuum and the first and second substrates 110 and 120 may be aligned with respect to each other.

Figure 7B:
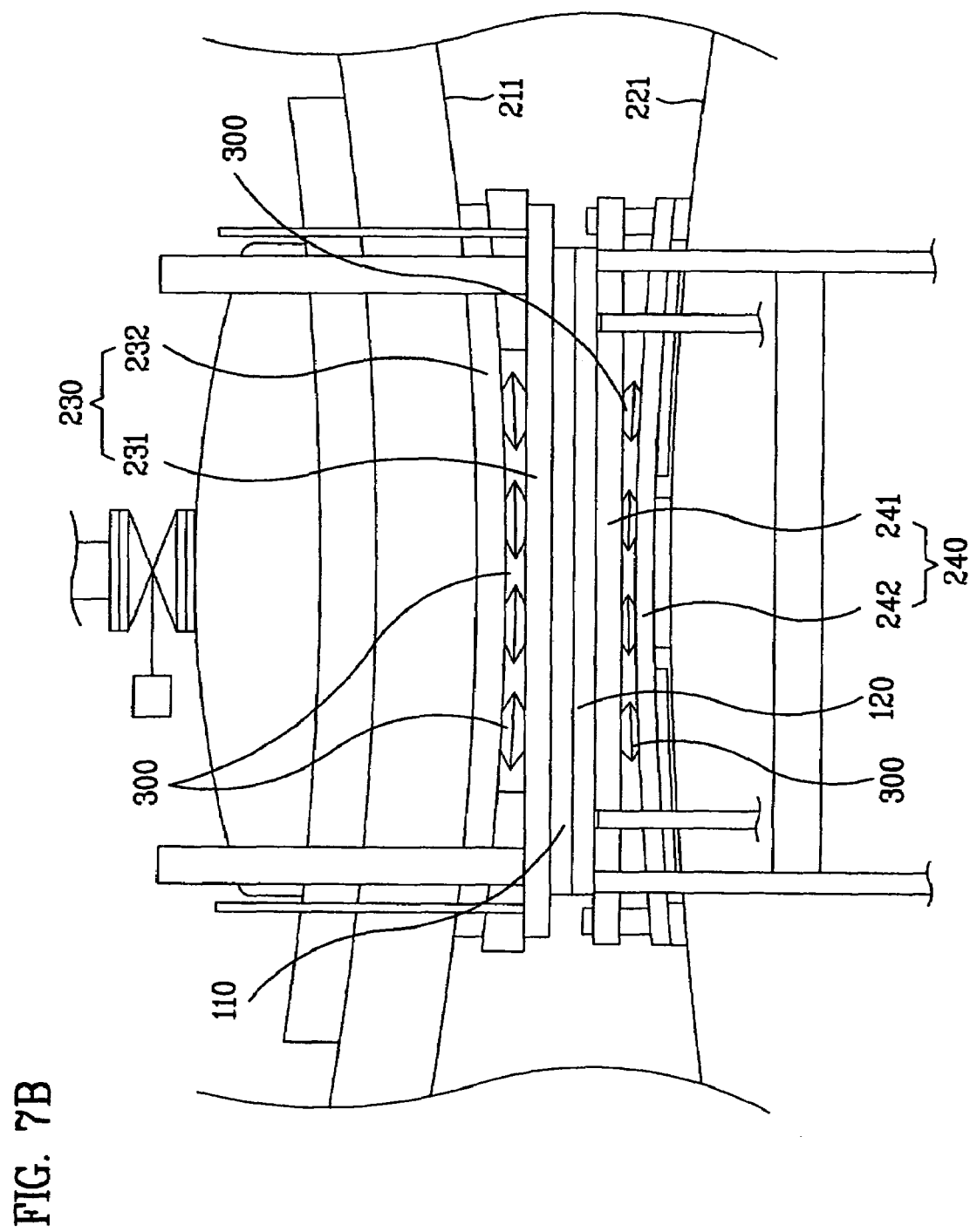

Referring to FIG. 7B, when the sealed interior space is evacuated to create the vacuum, center portions of the upper and lower chamber units 210 and 220 become inwardly (e.g., convexly) bent within the substrate bonding apparatus due to the weight of the securing plates 231 and 241, the weight of the stages 230 and 240, and difference in pressure between the vacuum state of the sealed interior space and an atmospheric pressure of the external environment. Additionally, the center regions of the fixing plates 232 and 242 of the upper and lower stages 230 and 240, respectively, may be convexly bent. However, the elastic members 300 provided between corresponding ones of the upper and lower chamber units 210 and 220 and the securing plates 231 and 241 (e.g., between corresponding ones of the fixing plates 232 and 234 and the securing plates 231 and 241) may exert restoration forces to the convexly bent upper and lower chamber units 210 and 220 (or to the fixing plates 232 and 242) such that the degree to which the securing plates 231 and 241 are bent may be minimized. Accordingly, the surface of the securing plate 231, to which the first substrate 110 is secured, may remain substantially parallel with the surface of the securing plate 241 to which the second substrate 120 is secured. Consequently, the bonding surface of the first substrate 110 may remain substantially parallel to the bonding surface of the second substrate 120 because the securing plates 231 and 241 of the upper and lower stages 230 and 240 remain substantially unbent, even though the center regions of the upper and lower chamber units 210 and 220 are convexly bent.

Figure 8:
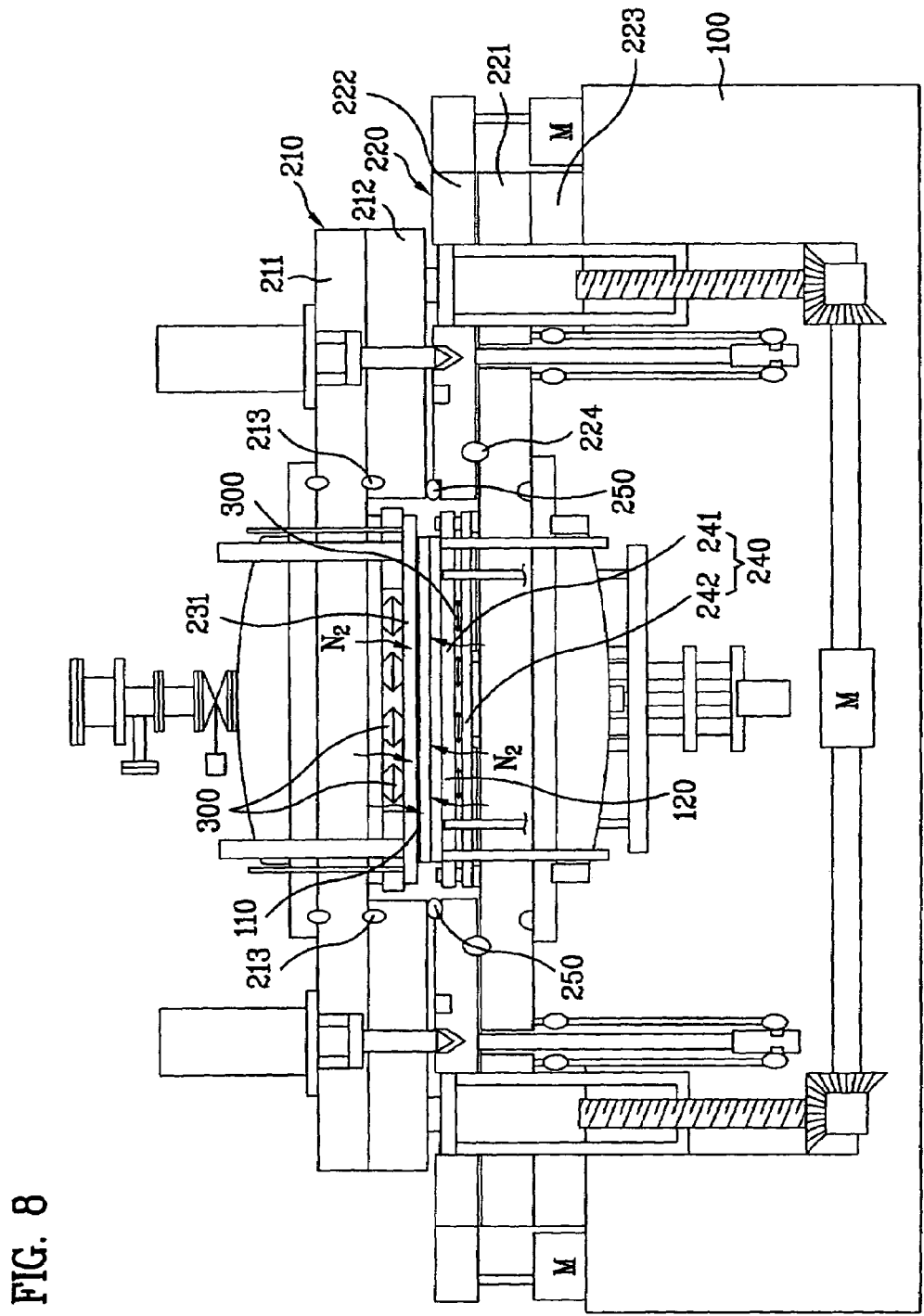
FIG. 8 illustrates the venting of chamber units in the substrate bonding apparatus for manufacturing LCD devices according to the principles of the present invention.

After being aligned, the first and second substrates 110 and 120 may be completely bonded to each other during a venting process. Referring to FIG. 8, the venting process may, for example, include injecting a gas such as nitrogen ($N_2$) through the upper and lower stages 230 and 240 and into the sealed interior space defined by the upper and lower chamber units 210 and 220. Upon venting the sealed interior space, the first substrate 110, previously secured to the upper stage 230, becomes separated from the upper stage 230 and completely bonded to the second substrate 120 due to the pressure of the gas injected through the upper stage 230. For example, a space between the bonded first and second substrates 110 and 120 (i.e., a cell gap) may be maintained in a vacuum state due to the aforementioned evacuation of the interior space. Therefore, due to a difference in pressure between the cell gap and the vented sealed interior space, the first and second substrates 110 and 120 may be substantially bonded to each other.

After the substrate bonding process is complete, the bonded first and second substrates 110 and 120 are unloaded from the substrate bonding apparatus and the aforementioned substrate bonding processes may be repeated.

As has been described in accordance with the principles of the present invention, the substrate bonding apparatus for manufacturing LCD devices is advantageous because the overall size of the substrate bonding device may be reduced compared to related art substrate bonding devices because the substrate bonding device of the present invention is not provided with functionality to coat sealant material or dispense liquid crystal material onto substrates. Accordingly, the substrate bonding device provides a simplified design and saves space. Moreover, the volume of the interior space defined by the upper and lower chamber units may be minimized to thereby reduce the amount of time required to evacuate the interior space. By reducing the evacuation time, the amount of time required to fabricate an LCD device may be reduced.

Further, the elastic members may be provided between each of the stages and a corresponding one of the chamber units to substantially prevent the surface of the securing plates from being convexly bent within the substrate bonding apparatus even though the chamber units are convexly bent due to the weight of the stages and the pressure difference between the evacuated interior space and the atmospheric pressure of the external environment. Accordingly, the substrates may be completely bonded to each other.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A substrate bonding apparatus for manufacturing a liquid crystal display (LCD) device, comprising:

a base frame;

a lower chamber unit mounted to the base frame;

an upper chamber unit joinable to the lower chamber unit, wherein the upper and lower chambers define an interior space capable of being sealed and evacuated to apply a vacuum pressure;

an upper stage fixed to the upper chamber unit for securing a first substrate; and a lower stage fixed to the lower chamber unit for securing a second substrate;

wherein at least one of the upper and lower stages includes: a fixing plate coupled to a corresponding one of the upper and lower chamber units; a securing plate for securing a corresponding one of the first and second substrates; at least one first elastic member arranged between the corresponding one of the upper and lower chamber units and the fixing plate; and at least one second elastic member arranged between the fixing plate and the securing plate, wherein the securing plate includes a plurality of holes for transmitting a suction force to a secure substrate, and wherein the first and second elastic members apply restorative forces to the fixing plate and securing plate to oppose deformation of the fixing plate and securing plate due to deforming forces generated by convex bending of the corresponding one of the upper and lower chamber units due to application of the vacuum pressure and the weight of the upper and lower stages.

* * * * *